US010609031B2

(12) United States Patent
Bender et al.

(10) Patent No.: US 10,609,031 B2
(45) Date of Patent: Mar. 31, 2020

(54) PRIVATE CONSOLIDATED CLOUD SERVICE ARCHITECTURE

(71) Applicant: International Business Machines Corporation, Armonk, NY (US)

(72) Inventors: Michael Bender, Rye Brook, NY (US); Rhonda L. Childress, Austin, TX (US); David B. Kumhyr, Austin, TX (US); Joanna W. Ng, Unionville (CA)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 15/824,248

(22) Filed: Nov. 28, 2017

(65) Prior Publication Data

US 2019/0166125 A1    May 30, 2019

(51) Int. Cl.
*H04N 7/16* (2011.01)
*H04L 29/06* (2006.01)
*H04L 29/08* (2006.01)

(52) U.S. Cl.
CPC .............. *H04L 63/10* (2013.01); *H04L 63/02* (2013.01); *H04L 63/065* (2013.01); *H04L 67/10* (2013.01); *H04L 67/12* (2013.01)

(58) Field of Classification Search
USPC ........................................................ 726/29
See application file for complete search history.

(56) References Cited

U.S. PATENT DOCUMENTS

| 8,087,016 | B2 | 12/2011 | Childress et al. | |
| 9,086,923 | B2* | 7/2015 | Parashar | G06F 9/5072 |
| 9,911,004 | B2* | 3/2018 | Plattner | G06F 16/256 |
| 10,142,346 | B2* | 11/2018 | Basetty | G06F 9/45558 |
| 10,219,175 | B2* | 2/2019 | Costa-Requena | H04L 12/4633 |
| 2014/0359704 | A1 | 12/2014 | Chen | |
| 2015/0215280 | A1 | 7/2015 | Chang et al. | |
| 2016/0212099 | A1 | 7/2016 | Zou et al. | |
| 2018/0091625 | A1* | 3/2018 | Hwang | H04L 67/34 |
| 2019/0028403 | A1* | 1/2019 | Moldvai | H04L 47/76 |

OTHER PUBLICATIONS

Solano, Antonio et al., "A Self-Provisioning Mechanism in OpenStack for IoT Devices", Sensors (Basel), vol. 16, Issue 8, Aug. 17, 2016, MDPI Open Acess, 19 pages.

* cited by examiner

*Primary Examiner* — Amare F Tabor
(74) *Attorney, Agent, or Firm* — Stephen J. Walder, Jr.; Jeffrey S. LaBaw

(57) ABSTRACT

Mechanisms are provided for providing a private consolidated cloud service architecture. The mechanisms operate to implement a private consolidated cloud service (PCCS) engine. The PCCS engine generates a private consolidated cloud (PCC) for a consumer based on one or more PCC characteristics specified by a request from the consumer. The PCCS engine also generates, in the PCC, for each of a plurality of public cloud services, a private instance of the public cloud service in the PCC. The PCC receives, from a consumer device, a request for processing of consumer private data by a specified private instance of a public cloud service in the PCC. The private instance of the public cloud service in the PCC performs the requested processing of consumer private data within the PCC without exposing the consumer private data outside the PCC. The PCC provides results of the requested processing to one of the consumer device or the public cloud service.

18 Claims, 5 Drawing Sheets

PRIVATE CONSOLIDATED CLOUD SERVICE ARCHITECTURE

BACKGROUND

The present application relates generally to an improved data processing apparatus and method and more specifically to mechanisms for providing a private consolidated cloud service architecture.

Recent trends in computer technology have progressed towards the use of cloud computing infrastructures and the use of cloud services to provide resources and functionality to users. In general, cloud computing refers to Internet-based computing where shared resources, software, and information are provided to users of computer systems and other electronic devices (e.g., mobile phones) on demand, similar to the electricity grid. Cloud computing provides a consumption and delivery model for information technology (IT) services based on the Internet and involves over-the-Internet provisioning of dynamically scalable and usually virtualized resources.

Cloud computing is facilitated by ease-of-access to remote computing websites (e.g., via the Internet or a private corporate network) and frequently takes the form of web-based tools or applications that a cloud consumer can access and use through a web browser, as if the tools or applications were a local program installed on a computer system of the cloud consumer. Commercial cloud implementations are generally expected to meet quality of service (QoS) requirements of consumers and typically include service level agreements (SLAs). Cloud consumers avoid capital expenditures by renting usage from a cloud vendor (i.e., a third-party provider). In a typical cloud implementation, cloud consumers consume resources as a service and pay only for resources used.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system comprising a processor and a memory. The memory comprises instructions which are executed by the processor to configure the processor to implement a private consolidated cloud service (PCCS) engine. The method comprises generating, by the PCCS engine, a private consolidated cloud (PCC) for a consumer based on one or more PCC characteristics specified by a request from the consumer. The method also comprises generating, by the PCCS engine, in the PCC, for each of a plurality of public cloud services, a private instance of the public cloud service in the PCC. In addition, the method comprises receiving, by the PCC, from a consumer device, a request for processing of consumer private data by a specified private instance of a public cloud service in the PCC. Moreover, the method comprises performing, by the private instance of the public cloud service in the PCC, the requested processing of consumer private data within the PCC without exposing the consumer private data outside the PCC. In addition, the method comprises providing, by the PCC, results of the requested processing to one of the consumer device or the public cloud service.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
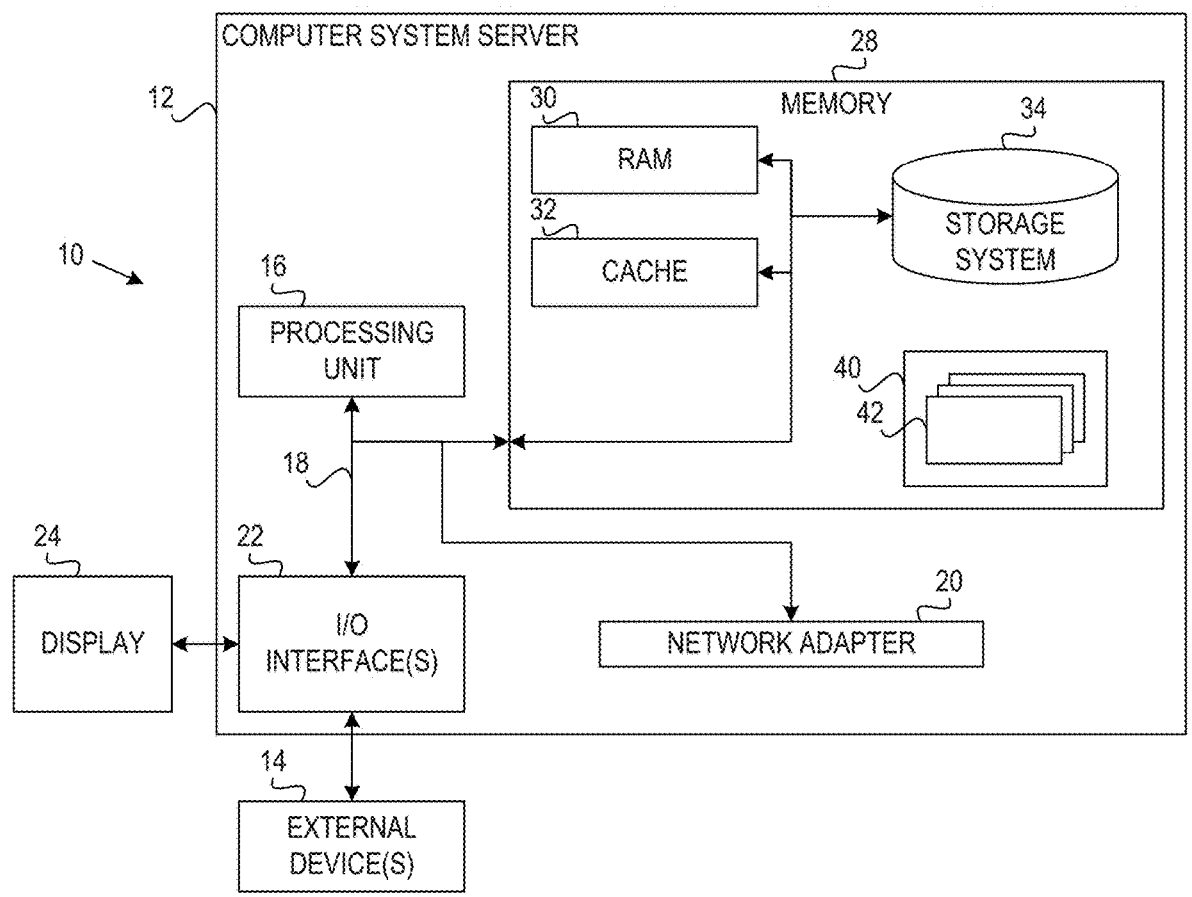
FIG. 1 is an example diagram of a distributed data processing system in which aspects of the illustrative embodiments may be implemented.

While cloud computing facilitates ease-of-access, there is concern regarding the privacy of cloud consumer activities performed in the cloud computing infrastructure and the privacy of cloud consumer data in the cloud computing infrastructure. That is, cloud consumers assume that if one is using a cloud computing service, the same security protections that the consumer would apply to their own localized activities and data are performed by providers of cloud services and cloud resources. However, providers of cloud services and cloud resources often focus their efforts on providing the services and/or resources themselves and making the provision of such services and/or resources meet with consumer expectations and service level agreements (SLAs). While they may provide security, the level of security provided by cloud service providers may be quite varied across providers and may not be sufficient to the particular cloud consumer. Ultimately, the responsibility for securing a cloud consumer's activities and/or data falls to the cloud consumer themselves to select the cloud computing services in the cloud they wish to use and the protection of their activities and data they wish to employ.

In addition, as more devices and services implement cloud computing as an underlying technology for supporting the operations of the devices and services, consumers are utilizing ever increasing cloud computing resources which generally are independent of each other. These devices are often referred to as "Internet of Things" or "IoT" devices and include such devices as smart phones, wearable activity tracking devices such as FitBit™, smart appliances in kitchens, and a plethora of other devices that connect to a wide area network, such as the Internet, and communicate with other IoT devices and/or server computing devices which may provide cloud computing based services based on the data communicated with the IoT device. A consumer may have multiple different IoT devices which individually operate with separate cloud based computing systems to perform operations, e.g., a consumer may have multiple different kitchen appliances, from multiple different manufacturers, which each communicate with a cloud computing based system to send and receive data as well as obtain functionality from services implemented in the cloud computing environment. Moreover, the consumer may also have wearable devices, smart phones, and the like, each of which have their own separate cloud computing system with which they are utilized.

These factors illustrate a potential for a lack of ability on the part of the consumer to protect their data to their own satisfaction when using cloud computing systems or services. That is, with multiple IoT devices, the consumer's data is spread to a plurality of different cloud computing systems and it may be arduous for the average consumer to keep apprised of the security of their data and institute appropriate protections with each of these different cloud computing systems. Moreover, with each cloud computing system, potentially implementing different levels of security mechanisms, the burden is placed on the consumer to distinguish the security mechanisms being used and employ their own security for each individual cloud computing system if the security provided by the cloud computing system is not sufficient for their needs.

The illustrative embodiments provide computer based mechanisms for implementing a private consolidated cloud service architecture. The private consolidated cloud service architecture provides consumers with the resources and functionality to establish a private cloud service which consolidates a plurality of public cloud services and controls the connections and flow of data to/from these public cloud services. That is, a consumer may select which public cloud services they wish to replicate in their own private consolidated cloud service architecture. For those that are selected, a private instance of the public cloud service is implemented in the private consolidated cloud service architecture, if possible. This may involve exchanging secure keys with the public cloud service provider which may then be used to facilitate secure communication of data between the public cloud service provider and the private instance of the public cloud service executing in the private consolidated cloud service architecture. It should be appreciated that this may be done for a plurality of different public cloud services associated with a plurality of different IoT devices or cloud services providers. The private consolidated cloud service architecture consolidates these various public cloud service offerings into a single private cloud which is configurable by the consumer to implement desired security measures and control the access of the consumer's private data.

Computer based mechanisms are provided in the private consolidated cloud service architecture, hereafter referred to as a consumer's "private consolidated cloud," to allow one consumer to securely and selectively connect to another consumer's secure private cloud computing system. For example, a personal key vault may be established to allow the consumer to connect to another consumer's personal cloud. The keys in the personal key vault may comprise public/private pairs or a single key with associated service (or parts of a service) that one will exchange corresponding data with the other consumer. It should be noted that whether the key is associated with a service or part of a service will depend on the specific services, e.g., some IoT devices may allow a consumer to specify specific data items to share with "friends" and has corresponding settings for other consumers, e.g., "friends", etc., defining what data is shared.

As an example, assume that a first consumer, Candace, wants to share parts of the consumer's private cloud with a friend named Michael. Candace knows Michael is very secure and feels comfortable having all of the data items that Candace shares in her private cloud under the management of a single security key with Michael, and Michael feels the same way. In such a case, Candace and Michael exchange security keys and, in their respective key vaults, enumerate the services in their private clouds for which they are willing to share data items with the other consumer, either through a native sharing function or through an anonymization function that anonymizes the data items prior to sharing with the other consumer. In the case of anonymization, while the consumer (Candace) may know that the data item(s) came from the other consumer (Michael), but the data item will be anonymized when sent such that some personal information regarding the consumer from which the data is received is masked.

It should be noted that there may also be separate security keys for different services either due to security, because a consumer has decided that he/she wants to share with a "group of friends" services, because the consumer wants to make sure that someone cannot intercept a single key in a friend's (e.g., Michael's) key vault and then attempt to walk down a potential list of services to break into other services, or the like. These are but example security implementations. The security implementations may also include block chain technology and other adaptations of known security mechanisms. Connections between the consumers can be static (i.e. once made stays until broken but keys are exchanged upon each communication to ensure no man-in-the-middle (MITM) attacks) or established as needed, but are done in an encrypted fashion. Data items that are sent between consumers may also be tagged and encapsulated "read only," "read and store," "store anonymous," or the like. The private cloud respects the tags of the data items and will only store information to which privileges have been granted, e.g., data that is "read only" is destroyed after a configurable amount of time.

The private consolidated cloud may further provide a "safe box" for the private data of the consumer, which may be protected by specific security keys and/or other data security mechanisms. A consumer's private consolidated cloud is independent of other consumer's private cloud computing systems or their own instances of private consolidated clouds such that a breach of the security of one private consolidated cloud does not affect the other consumer's private cloud systems. For example, in one illustrative embodiment, a consumer's private cloud may be a Docker container, or any other similar technology, that isolates one compute instance from another, thereby providing strict isolation of compute entities. A consumer can specify that their security can be either a virtual mechanism (such as a Docker container) or, if stricter security is required, may specify a complete physical system (cpu, disk, memory, etc.) isolation mechanism. The security level is managed and maintained by the consumer who owns the private cloud.

A single consumer may also have multiple private clouds with various security levels providing even greater encapsulation of security. For example, a consumer may have a physical set of security for one private cloud and also a virtual security mechanism, such as via a Docker container or the like, for another private cloud associated with the consumer. As another example, a consumer may have a Docker container type virtual security mechanism of one private cloud that fully encapsulates yet another Docker container type security mechanism of the same private cloud or a different private cloud. Any combinations of security mechanisms for one or more private clouds associated with a consumer may be used without departing from the spirit and scope of the illustrative embodiments.

Because the security mechanisms of the illustrative embodiments isolate one consumer's private cloud from other consumer's private clouds, while still allowing for secure sharing of data items, only the consumer whose private consolidated cloud has been breached will have their data at risk. However, since the consumer's data is stored in a data "safe box" in the consumer's private consolidated cloud, the risk of exposure of their data is minimized.

In one illustrative embodiment, the "safe box" is a combination of both physical and computational protections. Computational protections are tiered depending on the security requested by the consumer. At a minimum, the computational protection is encryption, but it may additionally include the use of additional password protections, the obfuscation of data via cyphers, etc. In some embodiments, the use of a private cloud within a private cloud may also apply for protections, with each private cloud containing different and distinct keys, e.g., when one has encapsulated containers, the system enforces the fact the "child" key cannot be the same, or a derivation of, the parent key. Any keys used to access the safe box may be required to be physically separate and distinct from the actual safe box storage itself. Physical protections may include, for example, a disk drive that has one or more of the following protections: (1) on occurrence of a power loss there is a built in battery backup mechanism, but if the appropriate key is not entered before the battery backup life expires a large magnet or magnetic wave renders the data unusable; (2) if the disk drive is removed from a specific physical geofenced area controlled by the consumer, the data is physically destroyed; (3) the disk drives are physically secured via a locking mechanism and, if that locking mechanism is tampered with, the data is physically destroyed; and other known or later developed physical protection mechanisms. Both the virtual and physical security mechanisms are highly maintained with the type of security enforcements that are selected being all under the control of the consumer. Data that is in the "safe box" may be encapsulated/tagged for memory usage purposes. Moreover, configurations of the "safe box" for this data (set by the consumer) may denote the length of time the data will/can stay in memory before it is destroyed, thereby reducing risk of an exploit, such as memekatz, or the like.

In the case where a consumer's private consolidated cloud computing system is breached, the private consolidated cloud may be moved to a new location and all data in the previous private consolidated cloud location may be destroyed. The private consolidated cloud may be rebuilt at the new location. Alternatively, if a breach is suspected, the probability of breach of data is discovered/calculated and if the probability is that no data was breached, i.e. security keys were not breached, then upon detection a "data honeypot" may be created (or a standby data honeypot may be used). In such a case, access to the actual data vault or "safe box" is severed and the data honeypot is implemented to fool the interloper who caused the breach to continue to think they have access to the actual data. Any data that is in memory may be destroyed and re-populated with data from the data honeypot. At approximately the same time, the configuration file for the private cloud is retrieved from its own safe box (separate from the data safe box) and the rebuild of the personal cloud is completed in a new data location. Any configuration changes were captured and stored in the configuration safe box and the new instance is created with different security keys, followed by restoration of connectivity to the data safe box where the actual data is stored.

Via the consumer's private consolidated cloud, the consumer may configure the security of the various private consolidated cloud instances of public cloud services with regard to whether or not they may communicate the consumer's private data, or results generated by the private consolidated cloud instance based on the consumer's private data, to the corresponding public cloud service, or more generally outside the private consolidated cloud computing architecture. In general, it is desirable to set the security configuration of the private instances of cloud computing systems such that all consumer private data is maintained within the consumer's private consolidated cloud so that the consumer controls access to their own private data by preventing the external exposure of their private data outside the private consolidated cloud, and certainly if private data must be flowed outside the private consolidated cloud, protections are in place to prevent such data flows to those public cloud services and other external recipients that are specifically authorized by the consumer.

As mentioned above, the mechanisms of the illustrative embodiments provide a data "safe box" in which the consumer's private data is maintained in the private consolidated cloud. The safe box is only accessible by the consumer, or those that the consumer grants access to the safe box, such as via the exchange of security information, e.g., security keys used to access the data in the safe box. In the case where others are granted access to the safe box, it should be appreciated that access may be given by providing a copy of the private data (to which the other consumer is granted access) to the other consumer rather than permitting actual access to the original data so as to maintain security of the data in the safe box.

With the safe box, the consumer's private data is not permitted to flow out of the private consolidated cloud. The private cloud computing system instances within the private consolidated cloud perform any processing of the private data within the private consolidated cloud itself without transmitting the private data outside the private consolidated cloud. Results of such processing may be sent to the external public cloud computing systems if the consumer has granted such data exchanges through the security configuration of the instances of the cloud computing systems in the private consolidated cloud.

In the case where a public cloud service cannot be replicated as a private instance within the private consolidated cloud, when private data needs to be processed to perform an operation, rather than sending the private data outside the private consolidated cloud, a request may be sent into the private individual cloud to be processed and the appropriate response is authenticated and sent back, where this request may include the appropriate processing instructions needed to perform the processing of the private data. For example, a website may request a payment processing via a credit card payment. Any validation instructions from the web site for validating the credit card information is sent encrypted into the private consolidated cloud where the instructions are decrypted and executed on the private data within the private consolidated cloud. The results of the validation instruction execution are then returned to the public cloud computing system, e.g., authorized or not authorized. In this way, while the private consolidated cloud may not have a private instance of the public cloud computing system or service, the instructions required to perform functions may be dynamically provided to the private consolidated cloud for execution within the private consolidated cloud in order to maintain the security of the private data.

While in many cases the private consolidated cloud is associated with a single consumer, in some illustrative embodiments, the private consolidated cloud may be shared by a small group of closely related consumers. For example, this small group may be a work group within an organization, a small organization itself, a family of individuals, and the like.

For example, in some illustrative embodiments, a family consumer group may share the private consolidated cloud using a policy hierarchy that controls information accessible by minors and/or others that may have potentially limited technical or computing system capabilities. A consumer in the family group having super user privileges may set specific policies for IoT devices and corresponding private instances of cloud computing systems in the private consolidated cloud so as to control data access permissions for other consumers of the family group. Each consumer may have a unique identifier assigned to them so as to prohibit the ability to create multiple private consolidated clouds. That is, IoT devices are associated with that consumer's unique identifier and can only be a member of a single private consolidated cloud. In this way, a consumer in a family group cannot associate themselves or an IoT device associated with them, with more than one private consolidated cloud. If a consumer decides to change private consolidated cloud associations with one or more of the IoT devices, or which the consumer himself/herself, the IoT device or consumer account would need to be removed from a first private consolidated cloud and a new unique identifier would need to be generated for the second private consolidated cloud and used to register the consumer and/or IoT device with the second private consolidated cloud, with all data for that consumer or IoT device optionally being removed from the first consolidated cloud. Thus, again, the dispersion of private data associated with the private consolidated cloud is controlled to be within the private consolidated cloud.

Thus, the private consolidated cloud mechanisms of the illustrative embodiments provide the ability to create a container, i.e. a private consolidated cloud, for a fixed set of public cloud computing systems or services. In the case that a public cloud service supports instantiation as a private instance in a private consolidated cloud (PCC), an installation of the public cloud system or service in the PCC may be performed, such as by the public cloud system or service itself, or through importation and execution of an installation data package within the PCC. In the case where a public cloud computing system or service does not support private instances in PCCs, instructions for performing operations on private data may be provided to the PCC from the public cloud system or service, the private data may be processed using the received instructions within the PCC, and the results data may be returned to the public cloud system or service without exposing the private data to the public cloud system or service.

A single fixed price for providing the private consolidated cloud may be charged to the consumer, or consumer group, regardless of the number of consumers that are part of the consumer group. The private consolidated cloud mechanisms process all transactions in the private consolidated cloud using private instances of the public cloud computing systems or services which are consolidated into a single private consolidated cloud. Even for public cloud computing systems or services that cannot be replicated as private instances within the private consolidated cloud, required instructions for performing processing of private data may be dynamically provided to the private consolidated cloud mechanisms for processing the private data within the private consolidated cloud and provide results back to the public cloud computing system or service.

The private consolidated cloud mechanisms further provide functionality to control, via the specification of a security pattern requirement, the security for all of the private instances of public cloud computing systems or services that can be added to the private consolidated cloud, i.e. if a public cloud computing system or service does not meet the security pattern requirements, then a private instance of that public cloud computing system or service is not created within the private consolidated cloud. With such mechanisms, public cloud computing systems or services may advertise their security pattern based on a set ontology, thereby indicating whether or not the public cloud computing systems or services are able to be cloned or replicated in private consolidated clouds or identify what types of private consolidated clouds they may be cloned or replicated in based on security settings. These indications may specify, for example, whether the public cloud computing system can send calculations into the private consolidated cloud, whether the public cloud system can support a data vault mechanism through security key exchanges, the types (e.g., 126, 256 bit keys) and ways in which such security keys are controlled, etc. In some cases, if a certifying authority is established for certifying public cloud services for use with private consolidated clouds, then a certification verification may be used to determine what public cloud services may be replicated or cloned and used within the private consolidated cloud.

The private consolidated cloud mechanisms also provide functionality to contain all private data of a consumer in the private consolidated cloud service and is acted upon locally in the private consolidated cloud. Only when absolutely necessary, is the private data able to be sent to a public cloud computing system or service for processing and such transmission of data may be performed using encryption and security keys negotiated between the public cloud computing system or service and the private consolidated cloud.

The private consolidated cloud mechanisms also provide functionality to update the code only for the services, with no access to the data. That is, mechanisms are provided such that during updating of code of the public cloud service instances in the private consolidated cloud mechanism, access to the data vault or safe box is severed such that the access is shut off and all data in the memory is flushed. In this way, no private data remains in the private consolidated cloud instances for the service that is to be updated. In addition, depending on the service, access may continue to be denied until such a time as the owner of the service allows the connection to be re-granted. This is in case of criticality of the data. For example if the cloud service is a payment processing service, and there have been issues with the updating of the code for this payment processing service, the owner of the private cloud may have rules established in their preferences for the private consolidated cloud to wait a specified period of time, or until a particular event occurs, such as an acknowledgement message being received, a user input specifying to continue the process, or the like, before access to the private data within the private consolidated cloud is restore.

The private consolidated cloud mechanisms also provide functionality for limiting registration of consumers and IoT devices and their associated public cloud computing systems or services with the private consolidated cloud based on unique identifiers or security keys associated with the consumer or consumer group to which the private consolidated cloud corresponds. Moreover, mechanisms are provided for redirecting data transmissions and requests to/from IoT devices to the private consolidated cloud mechanisms and the particular private instances within the private consolidated cloud, as opposed to the public cloud computing systems or services. For example, in some illustrative embodiments, the public cloud service may configured the IoT devices themselves to thereby make the redirection of the data transmissions and requests to the private consolidated cloud, or may have a redirection services that performs redirection on behalf of the IoT devices (or "agents"). In other illustrative embodiments, third party interceptor service may be provided to perform such redirection.

In some illustrative embodiments, the private consolidated cloud mechanisms provide a dashboard or other user interface via which a user (consumer) may set persistent characteristics of the private consolidated cloud which may be applied across all of the private instances of cloud computing systems or services. For example, through the dashboard, a user may set characteristics to indicate a level of security to be applied to the user's private data as well as other configuration parameters and/or characteristics of the private consolidated cloud mechanism. This specification of a persistent characteristic may be done in a policy inherited manner, such as described in U.S. Pat. No. 8,087,016, entitled "Enforcing Hierarchical Management Policy," for example. This security level is applied to all of the private instances of cloud computing systems or services such that each implements the security level in their specific way. For example, a user may specify that they want a "strong" level of security for their private data. This security policy designation of a "strong" level of security may be mapped to specific security mechanisms for each of the private instances of cloud computing systems or services based on inheritance such that each private instance of cloud computing systems or services implements their own version of "strong" security. The user need not know what mechanisms each private instance utilizes to enact security but only that the user has specified a desired level of security and that security will be implemented with each private instance. Moreover, if a public cloud computing system or service changes the security mechanisms it supports, such changes may be automatically implemented in the private consolidated cloud in that the user's persistent characteristics may be mapped to the newly defined security mechanisms for the public cloud computing system or service and implemented with regard to the private instances.

The specification of a private consolidated cloud wide set of characteristics, such as security level or security policy, is one example of the specification by the consumer of a security pattern to be applied to all instances of public cloud services that are to be implemented within the private consolidated cloud. For example, a consumer may specify that the private consolidated cloud service will only accept a public cloud service instances that have a security level of x. If a public cloud service advertises its security level to be x−2 levels, then this public cloud service does not meet the required security level or security pattern.

Thus, the illustrative embodiments provide mechanisms that consolidate public cloud computing systems or services into a single private consolidated cloud. This facilitates consumer control of the security over their private data such that their private data is not released to public networks. Moreover, this consolidation facilitates the consumer's specification of security mechanisms to be implemented with their private data and cloud computing systems or services by allowing the consumer to set persistent characteristics that are automatically converted to security mechanisms implemented with regard to each of the private instances of the cloud computing systems or services within the private consolidated cloud.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments may be utilized in many different types of data processing environments in which cloud computing systems or services are provided. In order to provide a context for the description of the specific elements and functionality of the illustrative embodiments, FIGS. 1-4 are provided hereafter as example environments in which aspects of the illustrative embodiments may be implemented. It should be appreciated that FIGS. 1-4 are only examples and are not intended to assert or imply any limitation with regard to the environments in which aspects or embodiments of the present invention may be implemented. Many modifications to the depicted environments may be made without departing from the spirit and scope of the present invention. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
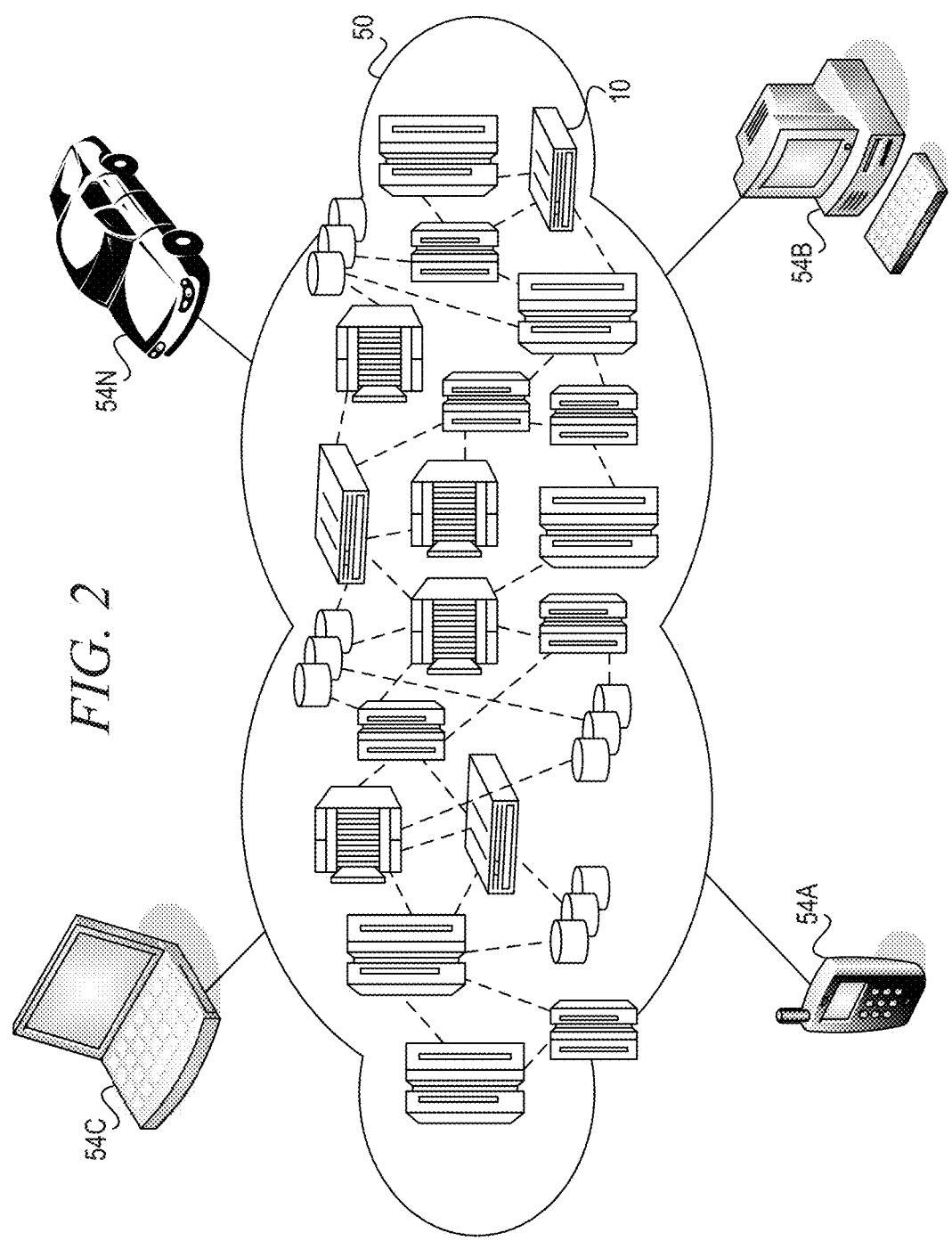
FIG. 2 is an example block diagram of a computing device in which aspects of the illustrative embodiments may be implemented.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
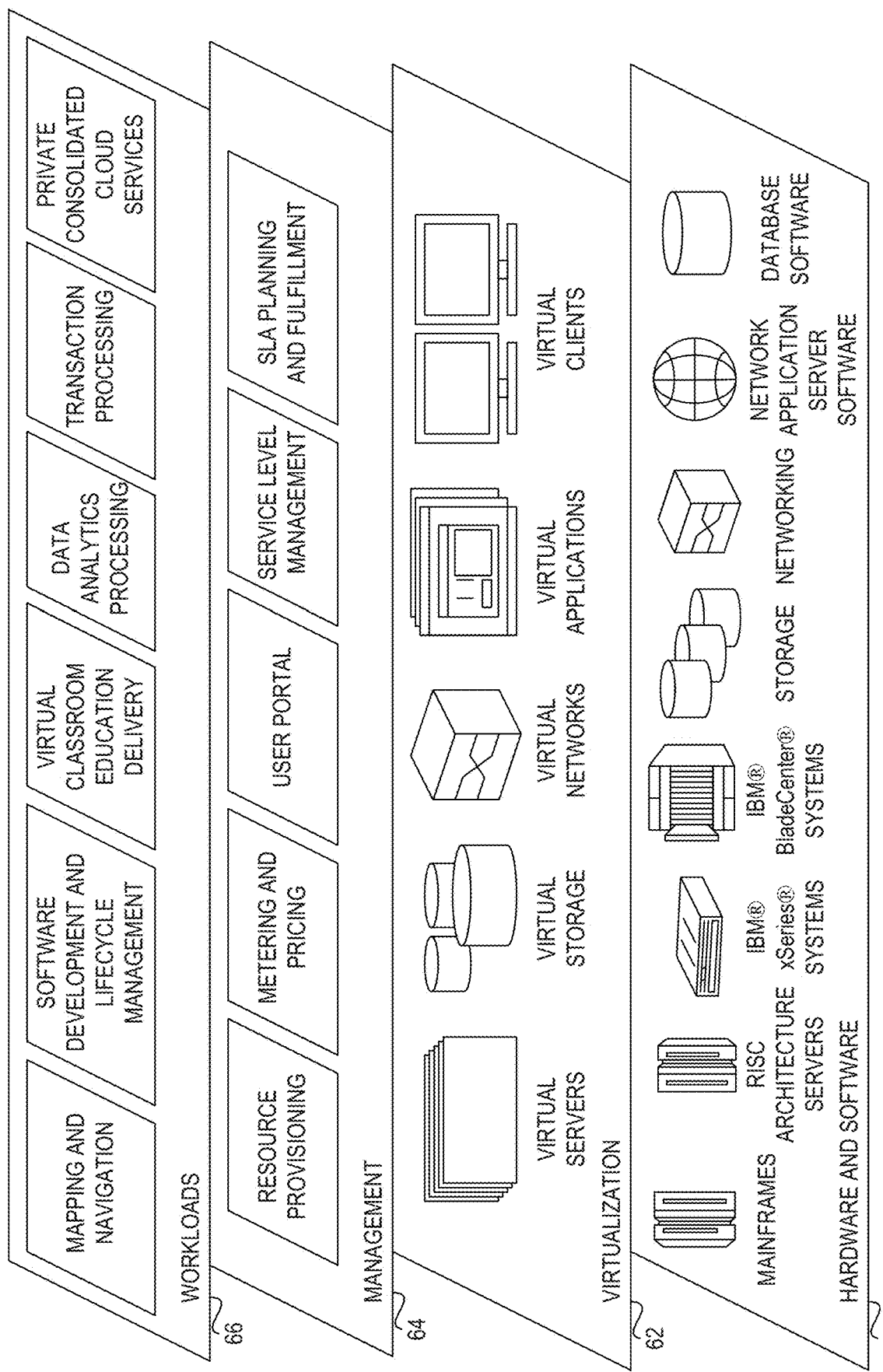
FIG. 3 is an example diagram of a set of functional abstraction layers provided by a cloud computing environment in accordance with one illustrative embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and, in accordance with the illustrative embodiments, providing private consolidated cloud services.

Figure 4:
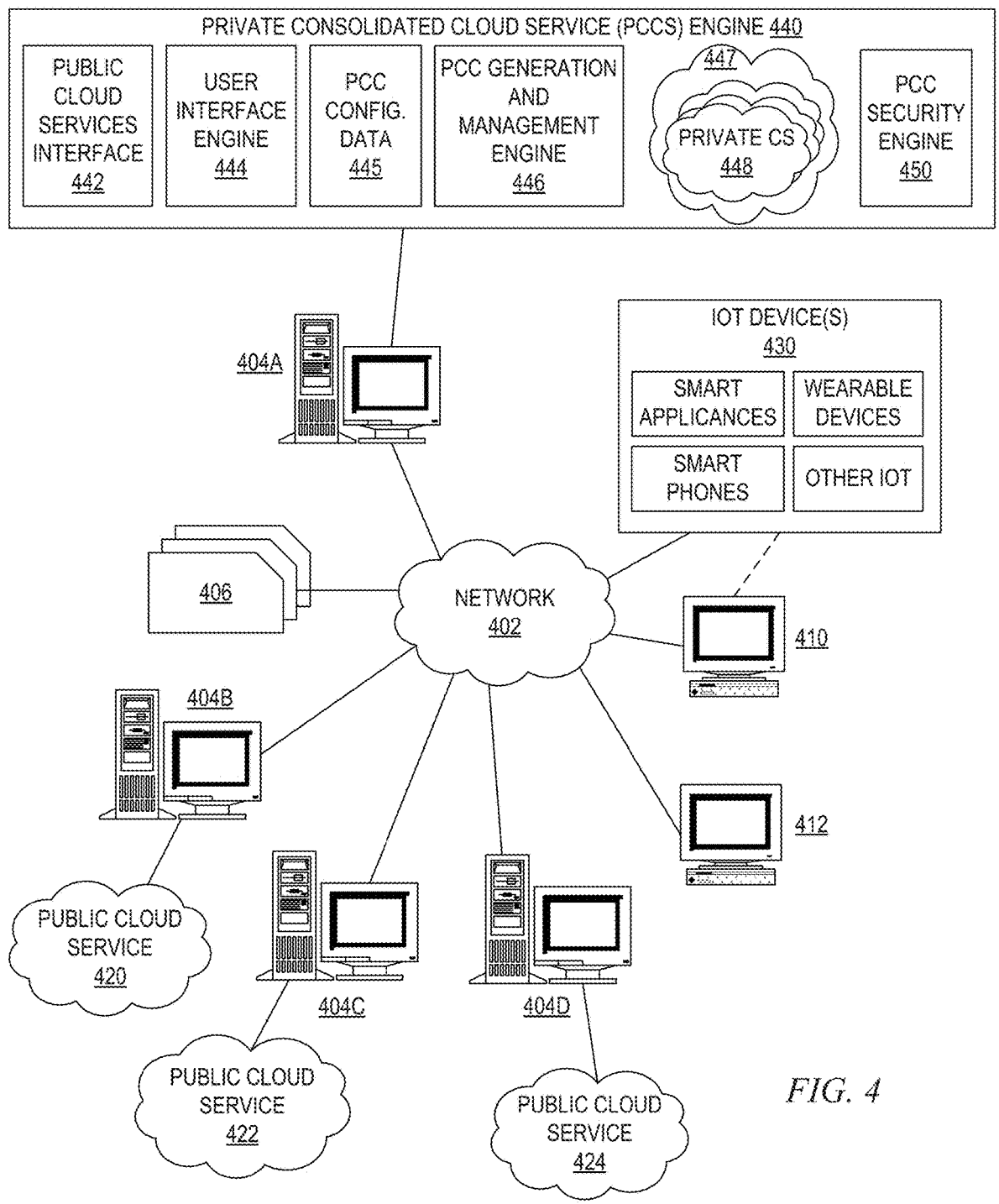
FIG. 4 depicts a pictorial representation of an example distributed data processing system in which aspects of the illustrative embodiments may be implemented.

FIG. 4 depicts a pictorial representation of an example distributed data processing system in which aspects of the illustrative embodiments may be implemented. Distributed data processing system 400 may include a network of computers in which aspects of the illustrative embodiments may be implemented. The distributed data processing system 400 contains at least one network 402, which is the medium used to provide communication links between various devices and computers connected together within distributed data processing system 400. The network 402 may include connections, such as wire, wireless communication links, or fiber optic cables.

In the depicted example, server 404 and server 406 are connected to network 402 along with storage unit 408. In addition, clients 410, 412, and 414 are also connected to network 402. These clients 410, 412, and 414 may be, for example, personal computers, network computers, or the like. In the depicted example, server 404 provides data, such as boot files, operating system images, and applications to the clients 410, 412, and 414. Clients 410, 412, and 414 are clients to server 404 in the depicted example. Distributed data processing system 400 may include additional servers, clients, and other devices not shown.

In the depicted example, distributed data processing system 400 is the Internet with network 402 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 400 may also be implemented to include a number of different types of networks, such as for example, an intranet, a local area network (LAN), a wide area network (WAN), or the like. As stated above, FIG. 4 is intended as an example, not as an architectural limitation for different embodiments of the present invention, and therefore, the particular elements shown in FIG. 4 should not be considered limiting with regard to the environments in which the illustrative embodiments of the present invention may be implemented.

As shown in FIG. 4, one or more of the computing devices, e.g., server 404A, may be specifically configured to implement a private consolidated cloud service (PCCS) engine 440. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates securing private data of cloud computing systems or services consumers by consolidating the public cloud computing systems or services (hereafter referred to collectively as cloud computing services) into a single private consolidated cloud for the consumer in which the consumer controls the security of their private data.

The PCCS engine 440 provides the computing system resources and logic for consolidating a plurality of public cloud services 420-422 that a consumer may wish to consolidate into a single private consolidated cloud 447 having private instances of those public cloud services 420-422. The private instances of the public cloud services 420-422 may execute operations on private data within the container of the private consolidated cloud 447 without exposing the consumer's private data to the public cloud services 420-424. Moreover, the consumer is given control over the security utilized with each private instance of the public cloud services so as to control what data, if any, may be exchanged between the private instance and the public cloud computing service. Furthermore, since the various public cloud computing services that the consumer utilizes are consolidated into a single private consolidated cloud, management of these various cloud computing services becomes more user friendly, with the mechanisms of the illustrative embodiments providing user interfaces, or dashboards, for facilitating such management.

As shown in FIG. 4, the PCCS engine 440 includes public cloud services interface 442, user interface engine 444, private consolidated cloud (PCC) configuration data storage 445, PCC generation and management engine 446, PCC 447 having private instances of cloud services (CS) 448, and a PCC security engine 450. These elements operate in conjunction with one another to achieve the objectives and provide the functionality described herein. It should be appreciated that the present description will attribute various functions or operations to various ones of the elements 442-450, however the illustrative embodiments are not limited to this particular configuration or allocation of functionality to the various elements 442-450. Furthermore, any functions or operations described herein that are not specifically attributed to one of the elements 442-450 in the PCCS engine 440 may be performed by other logic of the PCCS engine 440 which is not specifically depicted in FIG. 4. For example, control logic is expected to be provided in the PCCS engine 440 that provides functionality for coordinating and orchestrating the operations of the elements 442-450, however this control logic is not specifically depicted in FIG. 4 for the sake of focusing on the depicted elements and their functionality for achieving the objectives of the illustrative embodiments.

The public cloud services interface 442 of the PCCS engine 440 provides the logic and communication connection resources for communicating with one or more server computing devices hosting cloud computing services, such as server computing devices 404B-404D and cloud computing services 420-424. The user interface engine 444 provides the logic and resources for providing user interfaces, or dashboards, to consumers (or users) for use in configuring and managing their associated private consolidated clouds (PCCs) 447. The configuration may include specifying security patterns required for public cloud services to be replicated in the PCC, specifying which public cloud services are to be replicated in the PCC, security configuration data for application to a consumer's private data when being processed by a private instance of a cloud service 448, and the like.

The PCC configuration data storage 445 stores configuration information for consumers' PCCs 447 which may be specified via the user interfaces or dashboards provided by the user interface engine 444. The configuration information may be utilized by the PCC generation and management engine 446 when generating and managing the operation of a consumer's PCC 447.

The PCC 447 is the container in which private instances of the public cloud services 448 selected by a consumer are executed. In some cases where a private instance of a public cloud service cannot be generated in the PCC 447, the PCC 447 may further be utilized to dynamically receive instructions from a public cloud service 420-424 via a corresponding server computing device 404B-404D, which are executed within the PCC 447 to generate results which are returned to the public cloud service 420-424. The PCC 447 maintains a consumer's private data within the PCC 447, such as in a "safe box" or vault (not shown), such that the private data is not accessible outside the PCC 447 without the permission of the consumer.

The PCC security engine 450 provides the logic and resources for implementing security policies on the communication of data between private instances of cloud services 448 and other elements of the PCCS engine 440 and/or computing systems outside the PCCS engine 440. As noted above, a consumer may specify security levels to be applied to all private instances of cloud services in the PCC 447 via the user interfaces or dashboards generated by the user interface engine 444. The PCC security engine 450 provides the logic and resources to map these security characteristics to specific security policies to be applied to the various private instances of cloud services 448 such that the required security level is achieved with the processing and communication of private data by these private instances 448, even if the individual security mechanisms used by each private instance of the cloud service may be different.

In accordance with one illustrative embodiment, a consumer may utilize a plurality of IoT devices 430 and client computing devices 410, 412 which have access to a network 402. Via the network 402, which may be the Internet or other wide area network through which access to cloud computing services is made possible, the client computing devices 410, 412, and/or the IoT devices 430 may communicate with one or more server computing devices 404B-D that host public cloud computing services 420-424. It should be appreciated that while FIG. 4 illustrates each of the public cloud services 420-424 being associated with a single server computing device 404B-404D, the public cloud services may in fact be provided by a plurality of server computing devices, storage devices, and the like, as is generally known in the art.

Each IoT device 430 and client computing device 410, 412 may be configured to utilize one of the public cloud services 420-424 and communicate data to and receive data from the public cloud services 420-424 via the server computing devices 404B-404D and network 402. In some cases, the IoT devices 430 may communicate directly with the network 402 and in other cases they may communicate via one or more computing devices coupled to the network 402, such as client computing device 410, for example. The use of cloud computing systems and services by IoT devices is generally known in the art and thus, a further explanation is not provided herein.

A consumer, or small group of consumers such as a family, work group in an organization, a small organization, or the like, that is associated with the IoT devices 430 and/or client computing device 410 may send a request to the private consolidated cloud service (PCCS) engine 440 to establish a private consolidated cloud (PCC) for controlling the security of their private data, such as may be obtained from the IoT devices 430 and/or client computing devices 410, 412, with regard to the public cloud services 420-424. The PCCS engine 440 provides user interfaces via the user interface engine 444 through which the consumer (or user) may configure the private consolidated cloud (PCC) 447 generated by the PCCS engine 440. The configuration information input via the user interfaces, or dashboards, may include such information as a security pattern to be applied when determining whether or not a public cloud computing service may be replicated as a private instance 448 in the consumer's PCC 447, a selection of which public cloud services 420-424 are to be replicated as private instances 448 in the PCC 447, a security policy to be applied to all of the private instances of cloud services 448 that are present in the PCC 447, and other PCC 447 characteristics and configuration information, as previously discussed above.

This configuration information may be stored as PCC configuration data in a PCC configuration data structure storage 445 and used by the private cloud service instance engine 446 to generate a PCC 447 and manage the operation of the PCC 447 after it has been generated. With regard to generating the PCC 447, the PCC generation and management engine 446 may perform a process by which communications and negotiations are conducted between the PCC generation and management engine 446 and server computing devices 404B-404D hosting public cloud services 420-424 selected by the user for inclusion in the PCC 447, via the public cloud services interface 442 In one illustrative embodiment, the PCCS engine 440 may be configured to operate with a select set of public cloud services 420-424 from which a consumer may select which ones are to be included as private instances 448 in their PCC 447. Thus, a user interface or dashboard provided by user interface engine 44 may include a listing of the available public cloud services 420-424 and the consumer may select from the listing those that are to be used in the generated PCC 447.

The PCC generation and management engine 446, when generating the PCC 447 may evaluate each of the potentially available public cloud services 420-424 and, based on the consumer's selections, determine for each public cloud service 420-424 whether the public cloud service 420-424 is to be replicated as a private instance 448 in the PCC 447. As noted above, this may be determined based on user (or consumer) input to a user interface or dashboard specifying which public cloud services 420-424 are to be a part of the consumer's PCC 447. If a particular public cloud service 420-424 is not to be included in the PCC 447, then the interactions between the consumer's devices, e.g., IoT devices 430, client computing devices 410, 412, and the like, may be performed using the standard public cloud services interactions, as generally known in the art. If the particular public cloud service 420-424 is to be replicated as a private instance 448 in the PCC 447, a determination is made by the PCC generation and management engine 446 as to whether there is sufficient capacity with regard to storage resources, allocated processing resources, and/or other computing resources, in the PCC 447 to accommodate a private instance of the public cloud service. If there is not sufficient capacity, additional capacity of resources may be added or a response may be returned to the consumer that there is not sufficient capacity for the addition of the public cloud service to their PCC 447 and informing them that they should purchase additional capacity.

Assuming that there is sufficient capacity in the PCC 447 for a private instance of the public cloud service, or additional capacity is added automatically or by the consumer in response to a request from the PCC generation and management engine 446 to purchase additional capacity from the PCCS engine 440 provider, the PCC generation and management engine 446 may initiate a process to negotiate security information with a provider of the public cloud service, e.g., public cloud service 420. The PCC generation and management engine 446 may create a security key for communication with the public cloud service 420 provider's computing system, e.g., server 404B. The PCC generation and management engine 446 may enlist security mechanism of the PCC security engine 450 to generate such security keys. The generation of security keys and their use in secure communications is generally known in the art and thus, a more detailed description is not provided herein.

The generated security key is exchanged with the public cloud service 420 provider's computing system 404B which uses the security key to provide secure communications with the PCCS engine 440. As part of these communications, the public cloud service 420 provider's computing system 404B provides mechanisms for the creation of a private instance 448 of the public cloud service 420 in the PCC 447. For example, the computing system 404B may provide a software package for installation of a private instance within the PCC 447 which may then be executed within the PCC 447 without exposing access to the PCC 447 to the computing system 404B. The installation may be automated such that the consumer need not have an intimate knowledge of how to set up a cloud computing instance within the PCC 447. Alternatively, if the public cloud service 420 is a trusted service and the computing system 404B is trusted, the computing system 404B may be permitted to perform the necessary operations to install and configure a private instance of the cloud service 420 in the PCC 447. It should be appreciated that this private instance of the public cloud service 448 is a generic instance of the public cloud service 420 and has not yet been customized to the particular settings, persistent characteristics, and the like, that the particular consumer may have provided via the user interface or dashboard.

Having generated the generic private instance of the public cloud service 448, the PCC generation and management engine 446 configures the private instance 448 to the specifications set forth in the consumer's input to the user interface or dashboard as configuration parameters, persistent characteristics, and the like. In particular, the consumer may specify security restrictions with regard to the consumer's private data which are to be employed by the private instance 448, e.g., no exchange of private data outside of the PCC 447, only certain types of private data are permitted to be transmitted outside of the PCC 447, particular anonymization algorithms to employ on any data to be output outside the PCC 447, and/or the like. After applying the configuration parameters, persistent characteristics, and the like, the PCC generation and management engine 446 has generated a personally configured private instance of the public cloud service 420 in the PCC 447 which may be used to process private data of the consumer rather than releasing that private data to the network 402.

The PCC generation and management engine 446, with the assistance of the PCC security engine 450, may generate one or more specific security keys for the consumer to utilize with their IoT devices 430, computing devices 410, 412, and the like, when interacting with the private instance 448 such that communications between these devices and the private instance 448 in the PCC 447 are secure. In order for these devices 410, 412, 430 to communicate with the private instance 448, they may be configured by the PCC generation and management engine 446, through the secure communications with these devices afforded by the security keys, to direct communications from the particular devices 410, 412, and 430 that would originally be directed to the computing system 404B for accessing the public cloud service 420, instead to computing system 404A for accessing the private instance 448 in the PCC 447.

It should be appreciated that the consumer may add and remove public cloud services 420-424 that are replicated in the PCC 447 after generation of the PCC 447. Thus, when a consumer, via a user interface or dashboard provided by engine 444, specifies a modification to the PCC 447 to include/remove a public cloud service 420-424, appropriate processing is performed similar to that above to add private instances 448 of public cloud services 420-424, and appropriate processing is performed to remove a private instance of a cloud server 448 and any data associated with that private instance 448 when the consumer requests removal. In this way, the PCC 447 may be dynamically modified by a consumer as their needs or desires for the implementation of the PCC 447 change over time.

The PCC 447 generated by the PCC generation and management engine 446 includes mechanisms in the PCC 447 architecture to allow one consumer to securely and selectively connect to another consumer's PCC 447. The PCC 447 may further provide a "safe box" (not shown) for the private data of the consumer, which may be maintained by the PCC security engine 450, for example, and which may be protected by specific security keys and/or other data security mechanisms implemented by the PCC security engine 450. A consumer's PCC 447 is independent of other consumer's PCCs (not shown), or their own instances of other PCCs, such that a breach of the security of one PCC 447 does not affect the other consumer's PCCs or other PCCs implemented by the same consumer. That is, only the consumer whose PCC 447 has been breached will have their data at risk. However, since the consumer's data is stored in a data "safe box" maintained by the PCC security engine 450, in association with the consumer's PCC 447, the risk of exposure of their data is minimized.

In the case where a consumer's private consolidated cloud computing system is breached, the PCC security engine 450 may detect the breach, such as by way of known breach detection mechanisms, and initiate an operation to move the PCC 447 to a new storage location and all data in the previous PCC 447 storage location is destroyed. The PCC 447 is then rebuilt by the PCC generation and management engine 446 at the new storage location.

As noted above, via the consumer's PCC 447, the consumer may configure the security of the various private instances 448 of public cloud services with regard to whether or not they may communicate the consumer's private data, or results generated by the private instance 448 based on processing of the consumer's private data, to the corresponding public cloud service 420-424, or more generally outside the PCC 447 computing architecture. In general, it is desirable to set the security configuration of the private instances 448 such that all consumer private data is maintained within the consumer's private consolidated cloud so that the consumer controls access to their own private data by preventing the external exposure of their private data outside the PCC 447. These security configurations of the private instances 448 may be enforced by the PCC security engine 450 which may provide the security mechanisms employed by the private instances 448 when performing communications outside the PCC 447.

As mentioned above, the mechanisms of the illustrative embodiments provide a data "safe box" in which the consumer's private data is maintained in the PCC 447. The safe box is only accessible by the consumer, or those that the consumer grants access to the safe box, such as via the exchange of security information, e.g., security keys used to access the data in the safe box. With the safe box, the consumer's private data is not permitted to flow out of the PCC 447 unless specifically granted by the consumer and, even then, only using security mechanisms previously established with the recipient, e.g., security key negotiation or the like.

The private instances 448 within the PCC 447 perform any processing of the private data within the PCC 447 itself without transmitting the private data outside the PCC 447. That is, communications from the consumer's IoT devices 430 and computing devices 410, 412 that utilize a public cloud service 420-424 for which there is now a private instance 448 in the PCC 447 will direct those communications to the corresponding private instance 448 which operates in a similar manner to process these communications as would be done by the public cloud service 420-424. This may include processing data, generating results, and sending responses or replies indicating results. The communications between these devices 410, 412, and 430 may be secured using security keys and other security mechanisms as is generally known in the art. The actual processing of private data is performed entirely within the PCC 447 with potentially only results being returned to the public cloud service 420-424 without providing the actual private data of the consumer. The results of such processing may be sent to the external public cloud service 420-424 only if the consumer has granted such data exchanges through the security configuration of the private instances 448 in the PCC 447.

In the case where a public cloud service cannot be replicated as a private instance 448 within the PCC 447, when private data needs to be processed to perform an operation, rather than sending the private data outside the PCC 447, a request may be sent by the PCC generation and management engine 446 into the PCC 447 to be processed and the appropriate response is authenticated and sent back to the public cloud service 420-424, where this request may include the appropriate processing instructions needed to perform the processing of the private data. That is, via the public cloud services interface 442, the PCC generation and management engine 446 may communicate with a public cloud service 420-424 provider's computing system 404B-404D to obtain a portion of code comprising instructions for performing a required processing of private data. This portion of code may be returned to the PCCS engine 440 in response to the request and the PCC generation and management engine 446 may provide the code to the PCC 447 which performs the necessary processing of private data within the PCC 447 using the code provided by the public cloud service 420-424 provider's computing system 404B-404D. The provided portion of code may then be removed from the PCC 447 and results of the processing may be returned to the public cloud service 420-424. In this way, while the PCC 447 may not have a private instance 448 of the public cloud computing service 420-424, the instructions required to perform functions may be dynamically provided to the PCC 447 for execution within the PCC 447 in order to maintain the security of the private data.

As discussed previously, in some illustrative embodiments, the PCC 447 may be shared by a small group of closely related consumers. For example, this small group may be a work group within an organization, a small organization itself, a family of individuals, and the like. In some illustrative embodiments, a family consumer group may share the PCC 447 using a policy hierarchy that controls information accessible by minors and/or others that may have potentially limited technical or computing system capabilities, which may be enforced by the PCC security engine 450. A consumer in the family group having super user privileges may set specific policies for IoT devices 430 (which may comprise IoT devices of a plurality of family consumer group members) and corresponding private instances 448 of cloud computing systems in the PCC 447 so as to control data access permissions for other consumers of the family group. Each consumer may have a unique identifier assigned to them by the PCC security engine 450 and/or PCC generation and management engine 446 so as to prohibit the ability to create multiple PCCs. That is, IoT devices 430 are associated with that consumer's unique identifier and can only be a member of a single PCC 447. In this way, a consumer in a family group cannot associate themselves, or an IoT device 430 associated with them, with more than one PCC 447. If a consumer decides to change PCC associations with one or more of the IoT devices 430, or which the consumer himself/herself, the IoT device 430 or consumer account would need to be removed from a first PCC 447 and a new unique identifier would need to be generated for the second PCC and used to register the consumer and/or IoT device 430 with the second PCC, with all data for that consumer or IoT device 430 optionally being removed from the first PCC 447. Thus, again, the dispersion of private data associated with the PCC is controlled to be within the PCC.

Thus, the private consolidated cloud mechanisms of the illustrative embodiments provide the ability to create a container, i.e. a PCC 447, for a fixed set of public cloud computing systems or services 420-424. The PCC 447 processes all transactions in the PCC 447 using private instances 448 of the public cloud computing systems or services 420-424 which are consolidated into a single PCC 447 associated with the consumer or consumer group. Even for public cloud computing systems or services 420-424 that cannot be replicated as private instances 448 within the PCC 447, required instructions for performing processing of private data may be dynamically provided to the PCC 447 for processing the private data within the PCC 447 and providing results back to the public cloud computing system or service 420-424.

The PCC 447 may further provide functionality to control, via the specification of a security pattern requirement, the security for all of the private instances 448 of public cloud computing systems or services that can be added to the PCC 447, i.e. if a public cloud computing system or service 420-424 does not meet the security pattern requirements, then a private instance 448 of that public cloud computing system or service is not created within the PCC 447. This required security pattern may be enforced by the PCC security engine 450, for example, when the PCC generation and management engine 446 is generating or modifying a PCC 447 for a consumer and may be a pre-filter for determining whether a particular public cloud system or service 420-424 should undergo additional operations for negotiating security keys and generating private instances 448. The PCC security engine 450 may compare security patterns published by the public cloud computing system or service 420-424 providers via their computing devices 404B-404D, to the required security pattern for the PCC 447 as specified by consumer input to the user interfaces or dashboards provided by the user interface engine 444.

As noted above, in some illustrative embodiments, the PCCS engine 440, via the user interface engine 444, may provide a dashboard or other user interface via which a user (consumer) may set persistent characteristics of the PCC 447 which may be applied across all of the private instances 448 of public cloud computing systems or services 420-424. For example, through the dashboard, a user may set characteristics to indicate a level of security to be applied to the user's private data. This specification of a persistent characteristic may be done in a policy inherited manner. This security level is applied to all of the private instances 448 of cloud computing systems or services such that each implements the security level in their own specific way. For example, a user may specify that they want a "strong" level of security for their private data. This security policy designation of a "strong" level of security may be mapped to specific security mechanisms for each of the private instances 448 of cloud computing systems or services 420-424 based on inheritance such that each private instance 448 implements their own version of "strong" security via the security mechanisms provided by the PCC security engine 450. The consumer need not know what mechanisms each private instance 448 utilizes to enact security, but only that the consumer has specified a desired level of security and that security will be implemented with each private instance 448. Moreover, if a public cloud computing system or service 420-424 changes the security mechanisms it supports, such changes may be automatically implemented in the PCC 447 in that the user's persistent characteristics may be mapped to the newly defined security mechanisms for the public cloud computing system or service 420-424 by the PCC security engine 450 and implemented with regard to the private instances 448.

Thus, the illustrative embodiments provide mechanisms that consolidate public cloud computing systems or services 420-424 into a single PCC 447. This facilitates consumer control of the security over their private data such that their private data is not released to public networks. Moreover, this consolidation facilitates the consumer's specification of security mechanisms to be implemented with their private data and cloud computing systems or services 420-424 by allowing the consumer to set persistent characteristics that are automatically converted to security mechanisms implemented with regard to each of the private instances 448 of the cloud computing systems or services 420-424 within the PCC 447.

It should be appreciated that while a single consumer's PCC 447 is shown in FIG. 4, the operations outlined above may be performed for each of a plurality of different PCCs 447 without departing from the spirit and scope of the illustrative embodiments. That is, there may be a repository of PCCs 447 generated and associated with the PCCS engine 440 and which are separately accessible in a secure manner by their respective consumers. An owner/operator of the PCCS engine 440 may charge a fee for the use of the PCCS engine 440 services. This fee, in some cases, may be a flat fee for a PCC regardless of the number of consumers associated with the PCC. The fees may be specified based on the number of public cloud computing systems or services that are instantiated as private instances in the PCC since larger numbers of private instances may require more resources to facilitate their execution within the private container of the PCC.

In addition, during operation with IoT devices 430 and/or computing devices 410, 412, it should be noted that, from the perspective of the consumer's IoT devices 430 and/or computing systems 410, 412, the operation of the cloud computing system or services 420-424 has not changed even after implementation of private instances 448 in the PCC 447. That is, these devices continue to operate in the same manner that they did with the public cloud services 420-424 but with their communications being redirected to the corresponding private instances 448 in the consumer's PCC 447 due to the reconfiguration of the communication parameters in these devices 410, 412, and 430. The only other difference that may be perceived is the particular security key(s) used to encrypt the data communications between these devices 410, 412, and 430, and the private instances 448. The private instances 448 still may provide the same responses to these communications as would be generated by the public cloud computing services 420-424 but without exposing the consumer's private data in the process, which instead is maintained within the PCC 447, such as in a "safe box."

Figure 5:
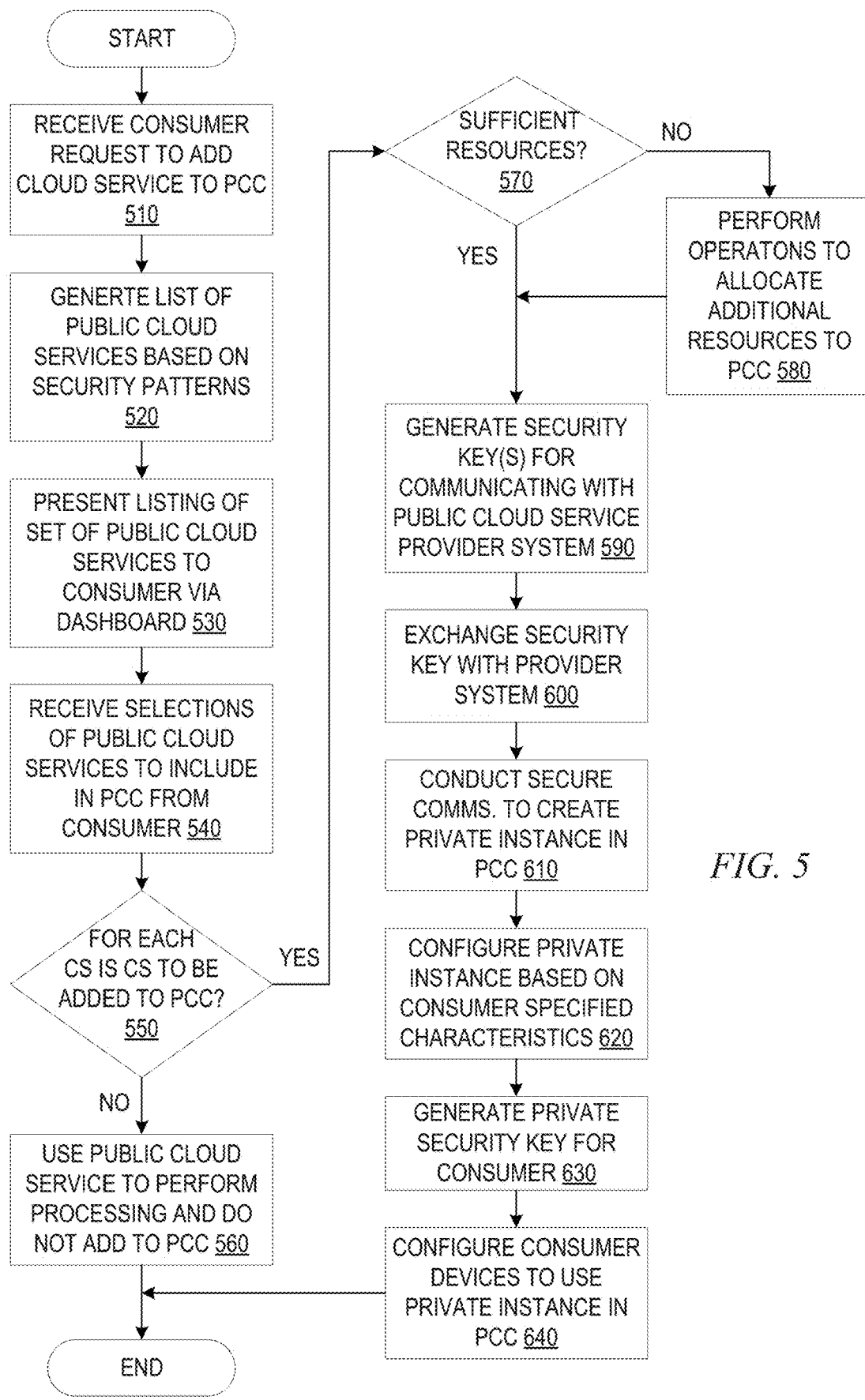
FIG. 5 is a flowchart outlining an example operation for generating or modifying a private consolidated cloud in accordance with one illustrative embodiment.

FIG. 5 is a flowchart outlining an example operation for generating or modifying a private consolidated cloud in accordance with one illustrative embodiment. The operation outlined in FIG. 5 will be described in conjunction with references to FIG. 4 to illustrate one example embodiment in which the mechanisms of FIG. 4 are used to provide a PCC for a consumer. It should be appreciated that the operation outlined in FIG. 5 is illustrated as being performed for a single public cloud service, however this operation may be repeated for each public cloud service that a user wishes to have added to their PCC.

As shown in FIG. 5, the operation starts with receiving a request from a consumer to add a private instance of a public cloud service to the consumer's PCC (step 510). As noted above, this may be done via a user interface or dashboard provided by the PCCS engine 440, such as may be generated by the user interface engine 444, for example. This operation may be done as part of an initial request to generate a PCC or as part of a request to modify an existing PCC. The request may further specify persistent characteristics that the PCC is to apply to private instances of cloud services that are associated with the PCC, if such persistent characteristics have not been previously specified or if they are being changed by the consumer. Among these persistent characteristics may be security patterns required for a particular public cloud service to be able to be replicated as a private instance in the consumer's PCC.

The required security pattern specified by the consumer may be compared to a plurality of advertised or published security patterns for public cloud computing services to identify a set of public cloud computing services whose advertised or published security patterns match those of the required security pattern (step 520) and a dashboard or user interface presenting a listing of the set of public cloud computing services may be presented to the consumer (step 530). The consumer may then select one or more public cloud computing services which are to be added to the consumer's PCC from the listing (step 540). In this way, the consumer generates a request The PCC generation and management engine 446, for example, may then traverse entries in its configuration data structures that correspond to each of the public cloud computing services that the PCC generation and management engine 446 is configured to operate with, to determine, for each public cloud computing service in the configuration data structures, whether the public cloud computing service is one of the ones that the consumer has selected for addition to the consumer's PCC (step 550). If not, then the consumer will still interact with the public cloud service rather than a private instance and no specific configuration of the PCC with regard to that public cloud service is necessary (step 560). If the public cloud service is one of the ones that was selected by the consumer for inclusion in the PCC, then further operations as described hereafter are followed to generate a private instance of the public cloud service. Of course, rather than having to traverse the entries for each of the available public cloud services, the specific ones selected by the consumer may be identified and the operation may bypass steps 550 and 560 altogether and proceed directly to step 570 and those thereafter which may be performed for each selected public cloud service.

For those public cloud services that were selected by the consumer for inclusion in the PCC, a determination is made as to whether there is sufficient capacity of resources in the PCC to accommodate the addition of a private instance of the public cloud service (step 570). If not, operations may be performed to add additional capacity to the PCC to accommodate the private instance(s) (step 580). These operations may entail the automatic allocation of additional resources sufficient to accommodate the private instance, outputting a notification to a user to purchase additional resources, or the like.

Assuming that there is sufficient capacity, or additional capacity has been added, in the PCC, a security key for secure communication between the consumer's PCC and the public cloud service provider's computing system is generated (step 590). The security key is exchanged with the public cloud service provider's computing system (step 600) and secure communications are conducted between the public cloud service provider's computing system and the consumer's PCC to create a private instance of the public cloud service in the consumer's PCC (step 610). The private instance is then configured to the specific configuration parameters specified by the user in the request so as to customize the private instance to the particular consumer (step 620).

A private security key for the consumer is generated for future communication directly with the private instance (step 630). The consumer's security key is provided to the consumer's IoT or computing device and the consumer's IoT or computing device is configured to redirect communications that would be sent to the public cloud computing service to instead be sent to the private instance in the PCC using the established consumer's security key (step 640). The operation then terminates. Although the operation is shown as terminating, it should be appreciated that this process may be repeated for each public cloud computing service that is to be represented in the consumer's PCC.

It should be appreciated that having generated a private instance in the PCC through the operations described above, and configured the consumer's IoT device or computing device to direct communications to the private instance, the consumer's IoT device or computing device then proceeds to perform its operations in a manner as it normally would but with communications being redirected to the private instance. Thus, the consumer's IoT device or computing device is not aware of the fact that processing is being performed by a private instance in a PCC as opposed to a public cloud service.

As noted above, additional operations for removing a private instance from the PCC may be provided as well. These operations are straight forward and thus, a separate flowchart is not provided herein. Suffice it to say that a removal of a private instance involves the deletion of all of the data associated with the private instance and the reconfiguring of the consumer's IoT device or computing device to again direct communications to the original public cloud service. For example, the applications running on the IoT device or computing device may have their communication settings reset to a default setting which would redirect the communications back to the original public cloud service.

Thus, the illustrative embodiments provide mechanisms for consolidating a plurality of public cloud computing systems or services into a single private consolidated cloud in which the consumer is given control of the security applied to their own private data. The consumer may control the flow of private data into and out of the private consolidated cloud. Private instances of public cloud computing systems or services may be provided inside the container of the private consolidated cloud such that processing is performed within the container on private data and the private data is not exposed outside of the container in the process. The private data may further be maintained in a "safe box" to ensure that exposure is not performed and to protect against such exposure even in the case of a beach of the private consolidated cloud. The private consolidated cloud further provides mechanisms for allowing a consumer to specify persistent security characteristics to be applied across a plurality of private instances of cloud computing systems or services with a security engine mapping such persistent security characteristics to specific security mechanisms supported by each of the private instances that provide the security level specified by the persistent security characteristics, thereby easing the management of a plurality of cloud services on the part of the consumer.

The mechanisms of the illustrative embodiments may be implemented in various environments in which security and protection of the dissemination of a user's private information is paramount. As security of private information becomes more of an issue, and access and dissemination of information becomes more pervasive in society, governments have instituted regulations to assist with the protection of individuals and their private information. The mechanisms of the illustrative embodiments may be implemented in computing systems to assist with meeting the standards and requirements set forth in such regulation. For example, in some illustrative embodiments, the mechanisms of the illustrative embodiments may be implemented in computing systems so as to meet with the requirements of the General Data Protection Regulation (GDPR) and similar regulations in other countries and regions of the world.

The GDPR is a regulation by which the European Parliament, the European Council, and the European Commission indent to strengthen and unify data protection for individuals within the European Union (EU), as well as the export of personal data outside of the EU. The GDPR's primary objective is to return control of personal data to the citizens of the EU and to simplify the regulatory environment for international business by unifying the regulation within the EU.

The mechanisms of the illustrative embodiments, as described above, clearly provide functionality and tools for assisting users with the maintaining and controlling their personal private data in a secure safe box within a private consolidated cloud thereby returning control of the user's data to the user. Thus, the mechanisms of the illustrative embodiments are in line with the goals of the GDPR, and similar data protection regulations and laws in other regions and countries of the world, and may be adopted and implemented so as to achieve the goals of returning control of a user's data to the user.

Moreover, through the implementation of the mechanisms of one or more of the illustrative embodiments, countries and regions of the world may control the transfer of data outside of their borders by establishing private consolidated cloud computing environments associated with geographic borders as applied to locations of computing systems, e.g., controlling the transfer of data from computing systems in one country to computing systems in another country via the private consolidated cloud computing system mechanisms described herein. Thus, nested private consolidated cloud computing systems may be achieved in which, at a first level, users may establish private consolidated cloud computing systems for their own personal data, and organizations, countries, political regions, and the like, may establish their own private consolidated cloud computing systems, in which the user's individual private cloud computing systems may be a part. Thus, multiple levels of data flow controls may be implemented using the mechanisms of one or more of the illustrative embodiments.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, wherein the memory comprises instructions which are executed by the processor to configure the processor to implement a private consolidated cloud service (PCCS) engine, the method comprising:

generating, by the PCCS engine, a private consolidated cloud (PCC) for a consumer based on one or more PCC characteristics specified by a request from the consumer;

generating, by the PCCS engine, in the PCC, for each of a plurality of public cloud services, a private instance of the public cloud service in the PCC;

receiving, by the PCC, from a consumer device, a request for processing of consumer private data by a specified private instance of a public cloud service in the PCC;

performing, by the private instance of the public cloud service in the PCC, the requested processing of consumer private data within the PCC without exposing the consumer private data outside the PCC; and providing, by the PCC, results of the requested processing to one of the consumer device or the public cloud service, wherein the private data is maintained in a virtual safe box within the PCC that is secured by one or more security keys, and wherein the PCC is isolated from other PCCs of other consumers.

2. The method of claim 1, wherein the one or more PCC characteristics comprises a security pattern requirement that applies to all private instances of public cloud services in the PCC.

3. The method of claim 2, wherein at least two private instances of public cloud services in the PCC implement the security pattern requirement using different security mechanisms.

4. The method of claim 1, wherein the consumer device is one of a wearable activity tracker device, a smart appliance, or a smart phone.

5. The method of claim 1, further comprising:
receiving, by the PCCS engine from a consumer, a selection of a public cloud service to be included in the PCC; and
determining, by the PCCS engine, whether the public cloud service meets at least one requirement specified by the one or more PCC characteristics, wherein a private instance of the public cloud service is generated in response to determining that the public cloud service meets at least one requirement specified by the one or more PCC characteristics.

6. The method of claim 1, further comprising:
receiving, by the PCCS engine from a consumer, an input specifying a portion of the private data that may be communicated to a public cloud service outside of the PCC; and
transmitting, by the PCC, the portion of the private data to the public cloud service.

7. The method of claim 1, further comprising, receiving, by the PCCS engine from a consumer, a selection of a public cloud service to be included in the PCC, and in response to receiving the selection:
determining, by the PCCS engine, whether the public cloud service supports private instantiation in the PCC;
in response to determining that the public cloud service supports private instantiation in the PCC, receiving an installation data package from the public cloud service and executing the installation data package within the PCC to generate a private instance of the public cloud service or executing an installation operation by the public cloud service to generate a private instance of the public cloud service within the PCC; and
in response to determining that the public cloud service does not support private instantiation in the PCC, obtaining instructions from the public cloud service that are executed within the PCC to process private data within the PCC and provide results data back to the public cloud service.

8. The method of claim 1, wherein generating, in the PCC, for each of the plurality of public cloud services a private instance comprises, for each public cloud service:
determining whether the public cloud service advertises a security pattern that meets a security pattern requirement specified in the one or more PCC characteristics;
in response to a determination that the public cloud service does not advertise a security pattern that meets the security pattern requirement, inhibiting instantiation of a private instance of the public cloud service in the PCC; and
in response to a determination that the public cloud service does advertise a security pattern that meets the security pattern requirement, generating a private instance of the public cloud service in the PCC and configuring the private instance of the public cloud service to implement a configuration specific to the consumer.

9. The method of claim 1, further comprising:
receiving, by the PCCS engine from a consumer, a selection of a portion of private data that is permitted to be transmitted outside the PCC to a specified recipient; and
configuring, by the PCCS engine, the PCC to implement an anonymization mechanism to anonymize the portion of private data prior to transmission of the portion of private data outside the PCC to the specified recipient.

10. A computer program product comprising a computer readable storage medium having a computer readable program stored therein, wherein the computer readable program, when executed on a computing device, causes the computing device to:
generate a private consolidated cloud (PCC) for a consumer based on one or more PCC characteristics specified by a request from the consumer;
generate, in the PCC, for each of a plurality of public cloud services, a private instance of the public cloud service in the PCC;
receive, by the PCC, from a consumer device, a request for processing of consumer private data by a specified private instance of a public cloud service in the PCC;
perform, by the private instance of the public cloud service in the PCC, the requested processing of consumer private data within the PCC without exposing the consumer private data outside the PCC; and
provide, by the PCC, results of the requested processing to one of the consumer device or the public cloud service, wherein the private data is maintained in a virtual safe box within the PCC that is secured by one or more security keys, and wherein the PCC is isolated from other PCCs of other consumers.

11. The computer program product of claim 10, wherein the one or more PCC characteristics comprises a security pattern requirement that applies to all private instances of public cloud services in the PCC.

12. The computer program product of claim 11, wherein at least two private instances of public cloud services in the PCC implement the security pattern requirement using different security mechanisms.

13. The computer program product of claim 10, wherein the consumer device is one of a wearable activity tracker device, a smart appliance, or a smart phone.

14. The computer program product of claim 10, wherein the computer readable program further causes the computing device to:
- receive, from a consumer, a selection of a public cloud service to be included in the PCC; and
- determine whether the public cloud service meets at least one requirement specified by the one or more PCC characteristics, wherein a private instance of the public cloud service is generated in response to determining that the public cloud service meets at least one requirement specified by the one or more PCC characteristics.

15. The computer program product of claim 10, wherein the computer readable program further causes the computing device to:
- receive, from a consumer, an input specifying a portion of the private data that may be communicated to a public cloud service outside of the PCC; and
- transmit, by the PCC, the portion of the private data to the public cloud service.

16. The computer program product of claim 10, wherein the computer program product further causes the computing device to receive, from a consumer, a selection of a public cloud service to be included in the PCC, and in response to receiving the selection:
- determine whether the public cloud service supports private instantiation in the PCC;
- in response to determining that the public cloud service supports private instantiation in the PCC, receive an installation data package from the public cloud service and execute the installation data package within the PCC to generate a private instance of the public cloud service or execute an installation operation by the public cloud service to generate a private instance of the public cloud service within the PCC; and
- in response to determining that the public cloud service does not support private instantiation in the PCC, obtain instructions from the public cloud service that are executed within the PCC to process private data within the PCC and provide results data back to the public cloud service.

17. The computer program product of claim 10, wherein the computer readable program further causes the computing device to generate, in the PCC, for each of the plurality of public cloud services a private instance at least by, for each public cloud service:
- determining whether the public cloud service advertises a security pattern that meets a security pattern requirement specified in the one or more PCC characteristics;
- in response to a determination that the public cloud service does not advertise a security pattern that meets the security pattern requirement, inhibiting instantiation of a private instance of the public cloud service in the PCC; and
- in response to a determination that the public cloud service does advertise a security pattern that meets the security pattern requirement, generating a private instance of the public cloud service in the PCC and configuring the private instance of the public cloud service to implement a configuration specific to the consumer.

18. An apparatus comprising:
a processor; and
a memory coupled to the processor, wherein the memory comprises instructions which, when executed by the processor, cause the processor to:
generate a private consolidated cloud (PCC) for a consumer based on one or more PCC characteristics specified by a request from the consumer;
generate, in the PCC, for each of a plurality of public cloud services, a private instance of the public cloud service in the PCC;
receive, by the PCC, from a consumer device, a request for processing of consumer private data by a specified private instance of a public cloud service in the PCC;
perform, by the private instance of the public cloud service in the PCC, the requested processing of consumer private data within the PCC without exposing the consumer private data outside the PCC; and
provide, by the PCC, results of the requested processing to one of the consumer device or the public cloud service, wherein the private data is maintained in a virtual safe box within the PCC that is secured by one or more security keys, and wherein the PCC is isolated from other PCCs of other consumers.

* * * * *